United States Patent
Becherer et al.

(10) Patent No.: US 9,316,747 B2
(45) Date of Patent: Apr. 19, 2016

(54) RADIOMETRIC MEASURING ARRANGEMENT

(71) Applicant: VEGA Grieshaber KG, Wolfach (DE)

(72) Inventors: Frank Becherer, Neuried (DE); Arnold Thomas, Alpirsbach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 14/511,642

(22) Filed: Oct. 10, 2014

(65) Prior Publication Data

US 2015/0253440 A1 Sep. 10, 2015

(30) Foreign Application Priority Data

Mar. 5, 2014 (EP) .................................... 14157791

(51) Int. Cl.
*G01T 1/20* (2006.01)
*G01F 23/288* (2006.01)

(52) U.S. Cl.
CPC ................ *G01T 1/20* (2013.01); *G01F 23/288* (2013.01)

(58) Field of Classification Search
CPC .......... G01T 1/1642; G01T 1/20; G01T 1/202
USPC ........................................ 250/370.11, 370.15
See application file for complete search history.

(56) References Cited

U.S. PATENT DOCUMENTS

| | | | | |
|---|---|---|---|---|
| 3,005,101 A | | 10/1961 | Bradford et al. | |
| 3,049,620 A | * | 8/1962 | George et al. | 250/261 |
| 3,127,749 A | * | 4/1964 | Bergvall et al. | 62/3.2 |
| 3,148,512 A | * | 9/1964 | Hoffman et al. | 62/6 |
| 3,274,387 A | * | 9/1966 | Putley | 250/352 |
| 3,942,010 A | * | 3/1976 | Peterson et al. | 250/352 |
| 4,036,618 A | * | 7/1977 | Leonard et al. | 62/50.7 |
| 4,046,407 A | * | 9/1977 | Porreco | 285/123.17 |
| 4,118,947 A | * | 10/1978 | Diedrich et al. | 62/51.1 |
| 4,206,354 A | * | 6/1980 | Small, Jr. | 250/349 |
| 4,241,592 A | * | 12/1980 | Tapphorn | 62/51.1 |
| 4,484,458 A | * | 11/1984 | Longsworth | 62/51.2 |
| 4,565,925 A | * | 1/1986 | Anderson et al. | 250/352 |
| 4,597,175 A | * | 7/1986 | Anderson et al. | 29/827 |
| 4,606,201 A | * | 8/1986 | Longsworth | 62/51.2 |
| 4,621,279 A | * | 11/1986 | Maier et al. | 257/716 |
| 4,697,635 A | * | 10/1987 | Longsworth et al. | 165/147 |

(Continued)

FOREIGN PATENT DOCUMENTS

DE      37 43 353 A1     12/1987

OTHER PUBLICATIONS

Search Report attached to the office action of the European Patent Office for related German Patent Application 14 157 791.6, issued Sep. 2, 2014.

*Primary Examiner* — David Porta
*Assistant Examiner* — Djura Malevic
(74) *Attorney, Agent, or Firm* — Juneau & Mitchell

(57) ABSTRACT

A radiometric measuring arrangement having at least one radiation source and one detection device for the purpose of detecting radioactive radiation, having a longitudinally extended scintillator for the purpose of generating radiation induced light flashes, a photosensitive element for the purpose of generating an electronic signal based on the light flashes, and an electronic measuring device for the purpose of processing the electronic signals, characterized in that a flexible cooling device is functionally assigned to the scintillator, surrounding the same coaxially, and conveying cooling means.

15 Claims, 2 Drawing Sheets

(56) References Cited

U.S. PATENT DOCUMENTS

| | | | | |
|---|---|---|---|---|
| 4,739,634 A | * | 4/1988 | Watanabe | 62/51.1 |
| 4,740,702 A | * | 4/1988 | Huang et al. | 250/352 |
| 4,791,298 A | * | 12/1988 | Dunn et al. | 250/352 |
| 4,918,308 A | * | 4/1990 | Neitzel et al. | 250/352 |
| 4,977,748 A | * | 12/1990 | Diedrich | 62/51.1 |
| 5,004,047 A | * | 4/1991 | Meier et al. | 165/158 |
| 5,435,379 A | * | 7/1995 | Moslehi et al. | 165/80.4 |
| 6,293,335 B1 | * | 9/2001 | Tawney et al. | 165/156 |
| 6,534,578 B1 | * | 3/2003 | Daikai et al. | 524/323 |
| 6,536,227 B1 | * | 3/2003 | Lee | 62/440 |
| 6,990,818 B2 | * | 1/2006 | Hofmann | 62/6 |
| 7,243,500 B2 | * | 7/2007 | Cowans et al. | 62/196.4 |
| 8,042,608 B2 | * | 10/2011 | Baker | 165/165 |
| 2010/0057063 A1 | * | 3/2010 | Arless et al. | 606/21 |
| 2011/0186170 A1 | * | 8/2011 | Oishi et al. | 138/140 |
| 2013/0174933 A1 | * | 7/2013 | Yamakawa et al. | 138/137 |

\* cited by examiner

RADIOMETRIC MEASURING ARRANGEMENT

CROSS REFERENCE TO RELATED APPLICATIONS

This patent application claims priority to European Patent Application 14 157 791.6, filed on Mar. 5, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

The present invention relates to a radiometric measuring arrangement.

2. Background of the Invention

The current state of knowledge is as follows.

Various different radiometric measuring arrangements are known from the prior art, for the purpose of measuring fill levels, density, and point levels. A radioactive beam source and a detection device are arranged on opposite sides of a container or area being monitored, to make the measurement. Gamma radiation is emitted by the radioactive beam source, through the container, and in the direction of the detection device, and said gamma radiation is to a greater or lesser degree absorbed along its path through the fill material according to the fill level and density of the fill material. Based on the radiation intensity detected by the detection device, it is possible to make a deduction about the fill level or the density of a fill material positioned between the beam source and the detection device. A detection of the point level is also possible.

By way of example, in the case of a measurement of the fill level, a radiation intensity detected by the detection device is indirectly proportional to a fill level in the container, such that a fill level measurement is possible for goods which are high.

One particular advantage of radiometric fill level measurement is that the components which are necessary for the measurement—particularly the beam source and the detection device—can be arranged outside of a container, and therefore neither the process conditions inside the container nor the properties of the fill material has consequences for the applicability of these measurement methods.

In the radiometric measuring arrangements known in the prior, it is known that the detection device is designed as a scintillator having a photomultiplier connected behind the same, as a photosensitive element. The gamma radiation arriving at the scintillator material stimulates the same by collisions, wherein the scintillator material returns to its starting state, giving off light in the process. Conclusions can be made about the intensity of the arriving radiation, and therefore—as specified above—about a fill level inside the container, by way of example, by measuring the amount of light—by way of example, via the photomultiplier and an electronic measuring device connected downstream of the same. However, organic scintillator materials in particular—for example polymer solids—are extremely temperature sensitive, and must therefore not be stored or operated above a certain threshold temperature. By way of example, for polystyrene as the scintillator material, this threshold temperature is +50° C.

By way of further example, a longitudinally extended scintillator can be made in the form of a fiber bundle, using the scintillator materials named above, which then has the advantage that it can be adapted to various different container shapes. In particular, such a scintillator can be arranged, for example, on the outer wall of a tank which, for example, has a round form, an arrangement which is very highly prized for the purpose of achieving a compact construction of the measuring arrangement. A particular advantage is that, due to the flexibility of the scintillator, there is also a high flexibility in use, and it is possible to avoid the production of a plurality of differently shaped scintillators—for example adapted to different tank shapes.

However, the spectrum of application of such scintillators is limited according to the ambient conditions, and particularly temperature, which is a disadvantage.

And this is where the present invention comes in. The problem addressed by the invention is that of further advancing a radiometric measuring arrangement, having a longitudinally extended, flexible scintillator, in such a manner that the same can be used independently of the prevailing ambient conditions, without losing its existing advantages.

BRIEF SUMMARY OF THE INVENTION

In a preferred embodiment, a radiometric measuring arrangement having at least one radiation source and one detection device for the purpose of detecting radioactive radiation, having a longitudinally extended scintillator for the purpose of generating radiation induced light flashes, a photosensitive element for the purpose of generating an electronic signal based on the light flashes, and an electronic measuring device for the purpose of processing the electronic signals, wherein a cooling device is functionally assigned to the scintillator, surrounding the same in the axial direction, and radially, and has a suitable design for conveying cooling means In another preferred embodiment, the radiometric measuring arrangement as described herein, wherein the cooling device has at least one first hose and the cooling means is conveyed between an outer shell of the scintillator and an inner wall of the first hose.

In another preferred embodiment, the radiometric measuring arrangement as described herein, wherein the first hose is designed as an accordion hose.

In another preferred embodiment, the radiometric measuring arrangement as described herein, wherein a second hose, preferably a fabric hose, is drawn over the accordion hose.

In another preferred embodiment, the radiometric measuring arrangement as described herein, wherein the cooling device has a first end piece with a first cooling means connector.

In another preferred embodiment, the radiometric measuring arrangement as described herein, wherein the first end piece is glued, bolted, or welded to the first hose.

In another preferred embodiment, the radiometric measuring arrangement as described herein, wherein the first end piece surrounds the circumference of the scintillator, and can be attached to the scintillator with a sealing clamp arrangement.

In another preferred embodiment, the radiometric measuring arrangement as described herein, wherein the clamp arrangement has a sleeve-like design, and has an inner bevel and a seal element on the circumference thereof, on an end which is oriented away from the first hose, said seal element working together with the inner bevel and an end element in such a manner that it fixes the clamp arrangement in the axial direction and seals against the scintillator.

In another preferred embodiment, the radiometric measuring arrangement as described herein, wherein the end element is designed as a cap nut.

In another preferred embodiment, the radiometric measuring arrangement as described herein, wherein the cooling device has a second end piece which can be connected to a housing cooling and/or a cover cooling of a housing, wherein the photosensitive element and/or the electronic measuring device is/are preferably arranged in the same.

In another preferred embodiment, the radiometric measuring arrangement as described herein, wherein the second end piece is connected to the housing in such a manner that the housing cooling and/or the cover cooling and the cooling device form a single cooling circuit.

In another preferred embodiment, the radiometric measuring arrangement as described herein, wherein the cooling device has a second end piece which has the same construction as the first end piece.

In another preferred embodiment, the radiometric measuring arrangement as described herein, wherein the second end piece also has a connection arrangement by means of which it can be connected to the housing of the measuring arrangement or the housing cooling.

In another preferred embodiment, the radiometric measuring arrangement as described herein, wherein the connection arrangement is arranged on the cap nut.

In a preferred embodiment, a cooling device for a radiometric measuring arrangement having a longitudinally extended scintillator which radially surrounds the scintillator, and which has a suitable design for conveying a cooling means.

In another preferred embodiment, the cooling device as described herein, wherein the cooling device is arranged in two or more sections.

DETAILED DESCRIPTION OF THE INVENTION

Figure 1:
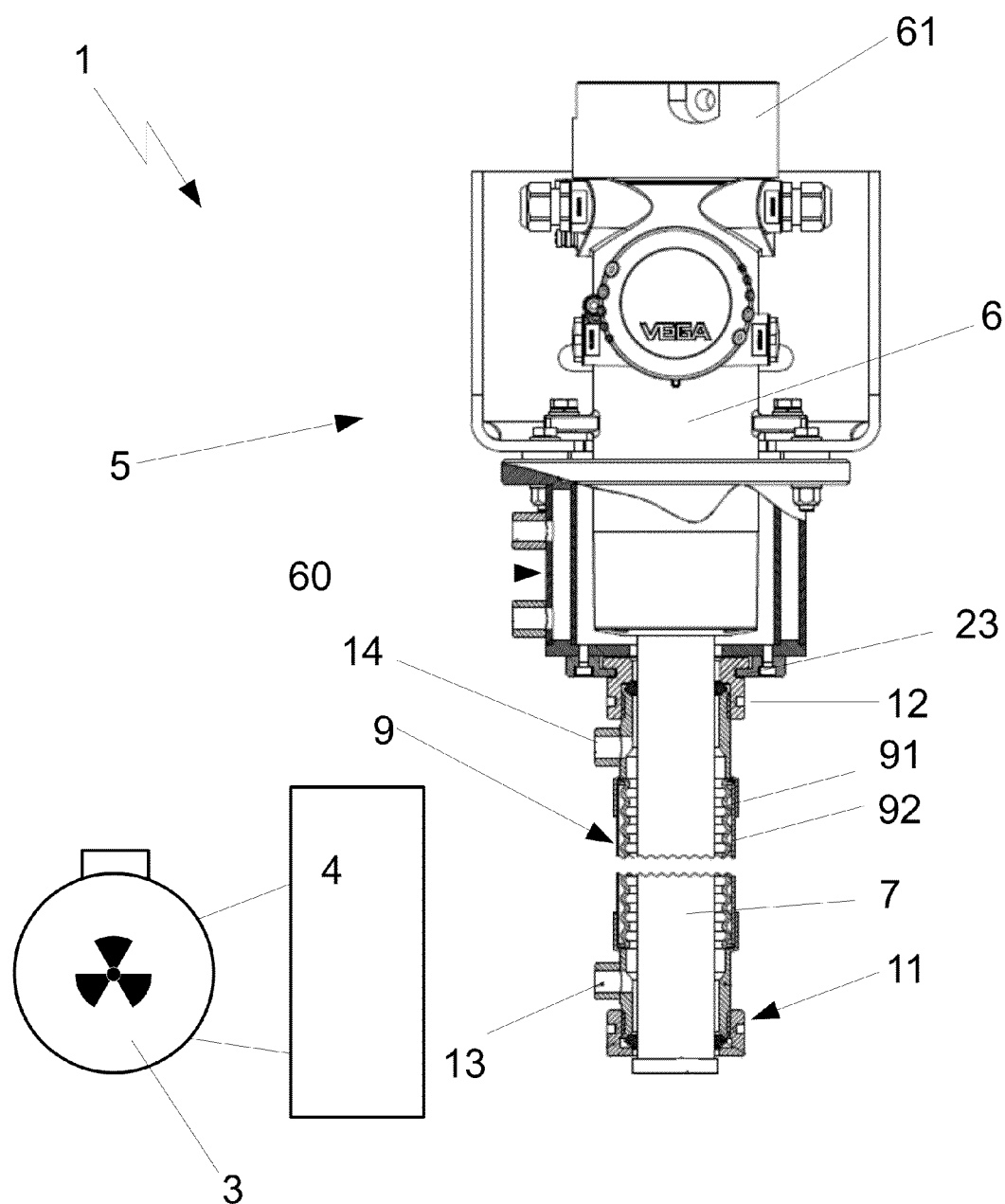
FIG. 1 is a line drawing evidencing a radiometric measuring arrangement.

A radiometric measuring arrangement according to the invention has at least one radiation source and one detection device for the purpose of detecting radioactive radiation, wherein the detection device has a longitudinally extended, flexible scintillator for the purpose of generating radiation induced light flashes, a photosensitive element for the purpose of generating an electrical signal based on the light flashes, and an electronic measuring device for the purpose of processing the electronic signals, and is characterized in that a flexible cooling device is functionally assigned to the scintillator, surrounding the same in the axial direction, and radially, and has a suitable design for conveying cooling means. In a preferred embodiment, such cooling device is arranged in sections.

As a result of such a flexible cooling device, the scintillator can be used, on the one hand, over a significantly larger temperature range. On the other hand, the property of flexible attachment, protected in the prior art, is not lost.

To make it possible to use the scintillators which are available in the prior art and already in use, for higher temperatures as well, a cooling device having the features of claim 15 is likewise the subject matter of the present invention.

In one implementation of the radiometric measuring arrangement, the cooling device has at least one first hose, wherein the cooling means is conveyed between an outer shell of the scintillator and an inner wall of the first hose.

The hose can be designed, by way of example, as an accordion hose for this purpose.

The use of a hose, particularly an accordion hose, as a component of the cooling device, makes it possible, on the one hand, that a cooling device can be made with a standard, available component, while on the other hand sufficient stability is achieved by the use of an accordion hose. The use of standard components in this case has a particularly positive effect on the manufacturing costs, because it is possible to avoid custom productions. An accordion hose offers, in addition to stability which can protect the scintillator from squeezing and impacts, by way of example, the flexibility necessary to obtain adaptability to different outer contours of containers.

In order to prevent expansion of the accordion hose in the axial direction upon the application of pressure by a cooling means, the hose can also be sheathed by a second hose—preferably a fabric hose. The provision of such a second hose, particularly a steel fabric hose, prevents expansion in the axial direction, such that it is then possible to prevent potential forces from acting on the scintillator.

In order to achieve a simplified connection of the present arrangement to a cooling means supply, the cooling device preferably has a first end piece with a cooling means connector, wherein the first end piece is preferably glued, bolted, or welded to the first hose.

The possibility of a defined cooling means connector is created by the provision of such a first end piece, which is glued or welded to the first hose, by way of example. Said cooling means connector can be oriented in the radial direction or in the axial direction, by way of example.

The end piece can have a bowl-shaped design, by way of example, such that it surrounds the end of the scintillator. In addition, it can have a cooling means connector arranged in the axial direction or the radial direction, by way of example.

To avoid the necessity of an end-face seal of the scintillator against the cooling means, it can alternatively be contemplated that the first end piece surrounds the circumference of the scintillator, and can be attached to the scintillator by a sealing clamp arrangement.

As a result of such an arrangement, it is possible, on the one hand, for a corresponding cooling device to be arranged if necessary in sections on a scintillator, and particularly for scintillators available according to the prior art to be retrofitted with a corresponding cooling device.

A corresponding clamp arrangement can have a sleeve-like design, by way of example, and can have an inner bevel around the circumference, and a seal element, on the end oriented away from the first hose, said seal element working together with the inner bevel and an end element in such a manner that it fixes the clamp arrangement in the axial direction and seals against the scintillator.

The end element can be designed for this purpose as a cap nut, by way of example, which can be attached by means of a suitable attachment arrangement—for example a bayonet catch or a threading on the end piece—preferably in a detachable manner. Force is applied to the seal element in the axial direction by the end element and/or the cap nut, such that a compression arises in the radial direction due to the circumferential inner bevel, which produces a clamping of the seal element to the scintillator and/or the outer shell thereof. The cooling device can therefore be attached easily to the scintillator, and can be arranged thereon particularly easily as a retrofit.

The cooling device preferably also has a second end piece which is preferably connected to the first hose and particularly can be connected to a housing cooling of a housing in which the photosensitive element and/or the electronic measuring device is/are preferably arranged. A corresponding end piece achieves a configuration wherein a single cooling circuit can be created by means of a connection with the housing's cooling, which can be present already, and therefore it is possible to avoid additional cooling means lines, such that the housing cooling and the cooling device preferably constitute a single cooling circuit.

As an alternative, the cooling device can have a second end piece which has the same construction as the first end piece, and therefore enables a flexible arrangement on the scintillator and/or the outer shell thereof. In particular, the second end piece can likewise have a clamp arrangement.

In order to achieve the most complete possible cooling of the scintillator, a connection arrangement can also be included on the second end piece, by means of which it can be connected to a housing of the measuring arrangement or a housing cooling. The connection arrangement achieves a configuration wherein one end of the cooling device can be connected to the housing, and therefore a cooling is ensured up to a point at which the scintillator enters the housing.

The connection arrangement can be arranged on the cap nut for this purpose, by way of example. A circumferential groove can be included, by way of example, into which a tensioning device—for example a plurality of clamp jaws—engages, tensioning the cap nut with the housing.

To ensure the possibility of retrofitting already available scintillators, a flexible cooling device for a radiometric measuring arrangement, having a longitudinally extended scintillator, is also the subject matter of the present invention, wherein the flexible cooling device encloses the scintillator in the axial direction, and is suitably designed for conveying cooling means.

DETAILED DESCRIPTION OF THE FIGURES

FIG. 1 shows one embodiment of a radiometric measuring arrangement 1, having a radioactive beam source 3 and a detection device 5, wherein a container is arranged between the radioactive beam source 3 and the detection device 5. Both the radioactive beam source 3 and the container 4 are only illustrated schematically in the present embodiment, to clarifying the functionality of the present radiometric measuring arrangement 1.

In the present embodiment, the radioactive radiation source 3 emits radioactive radiation in the form of gamma radiation, through the container 4 in the direction of the detection device 5. In the detection device 5, the gamma radiation arrives at a scintillator 7 which is excited by the incident gamma radiation, and returns to its starting state while releasing light. In the scintillator 7, which is longitudinally extended in the present embodiment—meaning designed with a significantly greater extension in the axial direction A than in the radial direction—the light flashes generated by the gamma radiation are relayed to a photosensitive element for the purpose of generating an electronic signal according to the light flashes. An electronic measuring device is connected behind the photosensitive element for the purpose of processing the electronic signal being generated, such that it is possible to tap a fill level signal, by way of example, at the output thereof. Both the photosensitive element and the electronic measuring device in the present embodiment are illustrated with no further detail, and are accommodated in a housing 6 into which the scintillator 7 opens.

The scintillator 7 in the present embodiment is designed as a flexible fiber bundle which has a substantially cylindrical shape, wherein the scintillator 7 typically has a length between 2 and 10 meters and a diameter of approximately 3 to 10 cm. A cooling device 9 is also included in the present embodiment for the purpose of cooling the scintillator 7, radially surrounding the scintillator 7. The cooling device 9 in the present embodiment has a first hose 91 which is designed as an accordion hose, and is surrounded by a second hose 92 which is designed as a fabric hose. The accordion hose 91 ensures, on the one hand, the necessary leak tightness for conveying a cooling means, and on the other hand ensures the necessary flexibility for the scintillator 7 to be able to further adapt to different housing contours. In addition, a mechanical stability in the radial direction is achieved by the accordion hose 91, which additionally protects the scintillator 7 from squeezing and impacts.

An expansion in the axial direction A is prevented by the fabric hose 92, which in the present embodiment is formed as a steel fabric and surrounds the accordion hose 91 externally, working together with a fixing on end pieces 13, 14 included on the end faces of the hoses 91, 92.

The cooling device 9 shown in FIG. 1 has a first end piece 11 on an end of the scintillator 7 which faces away from the housing 6, said end piece 11 having a substantially sleeve-like design. The first end piece 11 is connected to both the accordion hose 91 and the fabric hose 92. A corresponding connection can be produced, by way of example, by welding, gluing, or other suitable connection methods which particularly ensure a tight seal. The first end piece 11 also has a first cooling means connector 13 arranged in the radial direction, in the form of a connection fitting, such that a cooling means supply can be connected to the cooling device 9.

The second end piece 12, which is arranged on the end of the cooling device 9 which faces away from the housing, is likewise connected to the accordion hose 91 and the fabric hose 92, and has a second cooling means connector 14 which is likewise oriented in the radial direction. The second end piece 12 is also bolted to a housing cooling 60, such that a mechanical, fixed axial connection of the second end piece 12 to the housing cooling 60 and/or the housing 6 is achieved.

As an alternative to the second cooling means connector 14, a fluid connection to the housing cooling 60 can also be included, such that the housing cooling 60 and the cooling devices 9 form a single cooling circuit. In addition, as an alternative or in addition thereto, a connection to a cover cooling 61 of the housing can be included such that the cover cooling 61, the housing cooling 60, and the cooling device 9 form a single cooling circuit.

In the embodiment shown in FIG. 1, the housing cooling 60 has two separate cooling means connectors, wherein a single cooling circuit for the housing 6 and the scintillator 7 can nevertheless be formed by a suitable connection of the cooling device 9 to the housing cooling 60.

Figure 2:
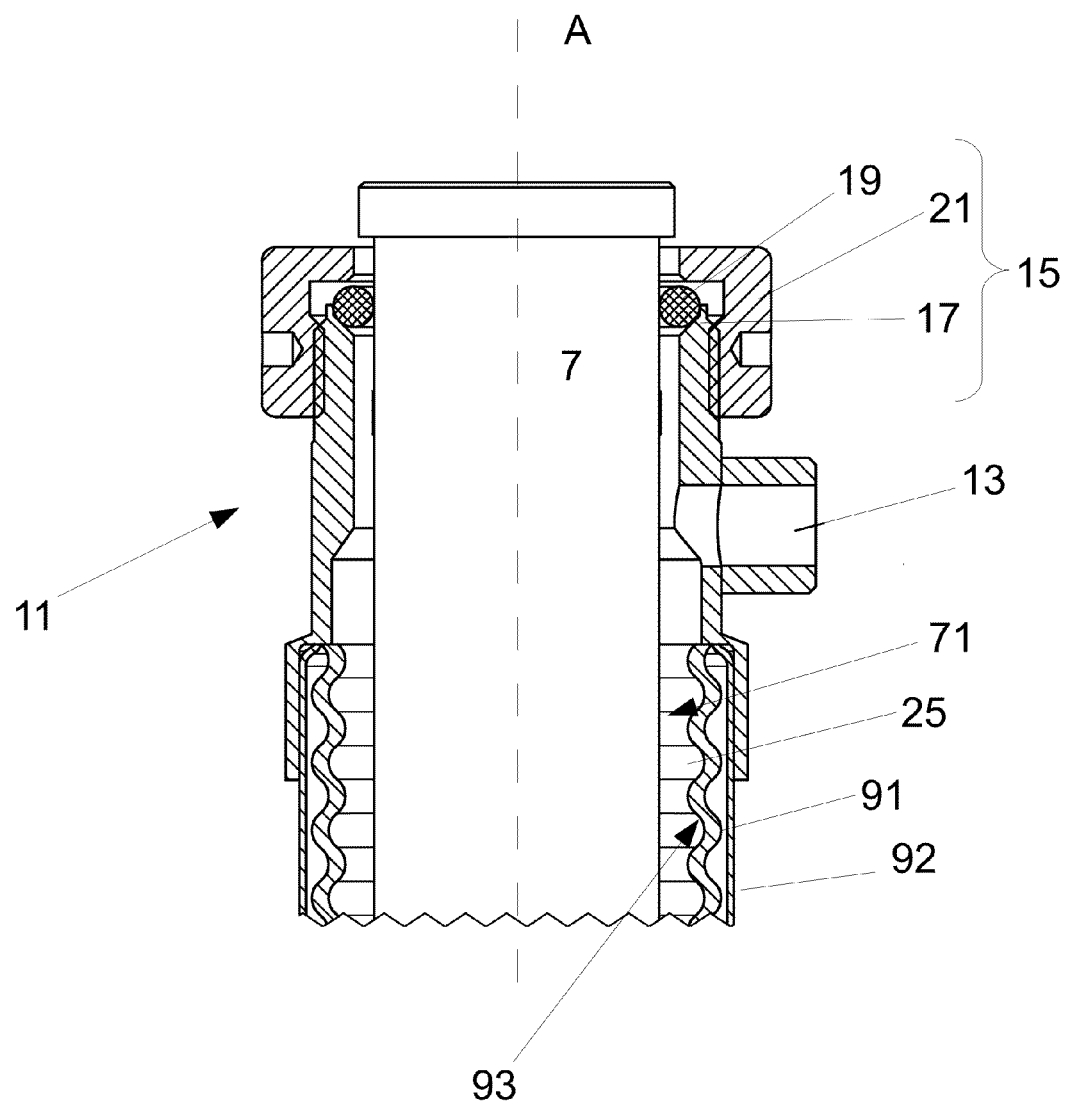
FIG. 2 is a line drawing evidencing a detail enlargement of FIG. 1.

FIG. 2 shows an enlarged illustration of the first end piece 11 in FIG. 1. The design features of this first end piece 11 can be accordingly transferred to the second end piece 12, such that there is no need in the present case for a separate drawing.

The first end piece 11 has, as already mentioned, a substantially sleeve-like design, and radially engages with the scintillator 7. It can be particularly clearly seen in FIG. 2 that the first cooling means connector 13 extends, in the form of a connection fitting, away from the first end piece 11 in the radial direction, and produces a fluid connection from the first cooling means connector 13 to a cavity 25 which extends between an outer shell 71 of the scintillator 7 and an inner wall 93 of the accordion hose 91. The accordion hose 91 and the fabric hose 92 in the present embodiment are glued or welded to the first end piece 11, by way of example. In this case, what is important is particularly that a connection with a tight seal for the medium is formed between the first end piece 11 and the accordion hose 91, and it is therefore possible to prevent cooling means from escaping.

The first end piece 11 is furthermore held on the scintillator 7 in a manner producing a seal, by means of a clamp arrangement 15. The clamp arrangement 15 is substantially formed by the interaction of an inner bevel 17 included on the first end piece 11 and a seal element 19 arranged abutting this inner bevel 17 circumferentially, along with a cap nut 21. The cap nut 21 is screwed onto the sleeve-like first end piece 11, with an inner thread, by way of example, and in the process compresses the seal element 19 in the axial direction A, the same thereby pressing against the circumferential inner bevel 15 and compressing in the radial direction. In this way, a clamp effect occurs between the seal element 19 and the outer shell 71 of the scintillator 7, such that a seal effect is achieved in addition to the clamp effect.

The sheathing of the accordion hose 91 with the fabric hose 92 also prevents an expansion of the accordion hose 91 in the axial direction A, as a result of the application of force by a cooling means, such that it is possible to prevent force acting on the scintillator 7 in the axial direction A.

LIST OF REFERENCE NUMBERS 1 radiometric measuring arrangement
3 radiation source
4 container
5 detection device
6 housing
7 scintillator
9 cooling device
11 first end piece
12 second end piece
13 first cooling means connector
14 second cooling means connector
15 clamp arrangement
17 inner bevel
19 seal element
21 end element/cap nut
23 connection arrangement
25 cavity
60 housing cooling
61 cover cooling
71 outer shell
91 first hose/accordion hose
92 second hose/fabric hose
93 inner wall
A axial direction The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A radiometric measuring arrangement having at least one radiation source and one detection device for the purpose of detecting radioactive radiation, having a longitudinally extended scintillator for the purpose of generating radiation induced light flashes, a photosensitive element for the purpose of generating an electronic signal based on the light flashes, and an electronic measuring device for the purpose of processing the electronic signals, wherein a flexible cooling device is functionally assigned to the scintillator, surrounding the same in the axial direction, and radially, and has a suitable design for conveying cooling means, wherein the cooling device has at least one first hose and the cooling means is conveyed between an outer shell of the scintillator and an inner wall of the first hose.

2. The radiometric measuring arrangement of claim 1, wherein the first hose is designed as an accordion hose.

3. The radiometric measuring arrangement of claim 2, wherein a second hose, preferably a fabric hose, is drawn over the accordion hose.

4. The radiometric measuring arrangement of claim 1, wherein the cooling device has a first end piece with a first cooling means connector.

5. The radiometric measuring arrangement of claim 4, wherein the first end piece is glued, bolted, or welded to the first hose.

6. The radiometric measuring arrangement of claim 4, wherein the first end piece surrounds the circumference of the scintillator, and can be attached to the scintillator with a sealing clamp arrangement.

7. The radiometric measuring arrangement of claim 6, wherein the clamp arrangement has a sleeve-like design, and has an inner bevel and a seal element on the circumference thereof, on an end which is oriented away from the first hose, said seal element working together with the inner bevel and an end element in such a manner that it fixes the clamp arrangement in the axial direction and seals against the scintillator.

8. The radiometric measuring arrangement of claim 7, wherein the end element is designed as a cap nut.

9. The radiometric measuring arrangement of claim 4, wherein the cooling device has a second end piece which can be connected to a housing cooling and/or a cover cooling of a housing, wherein the photosensitive element and/or the electronic measuring device is/are preferably arranged in the same.

10. The radiometric measuring arrangement of claim 9, wherein the second end piece is connected to the housing in such a manner that the housing cooling and/or the cover cooling and the cooling device form a single cooling circuit.

11. The radiometric measuring arrangement of claim 4, wherein the cooling device has a second end piece which has the same construction as the first end piece.

12. The radiometric measuring arrangement of claim 11, wherein the second end piece also has a connection arrangement by means of which it can be connected to the housing of the measuring arrangement or the housing cooling.

13. The radiometric measuring arrangement of claim 12, wherein the connection arrangement is arranged on the cap nut.

14. A flexible cooling device for a radiometric measuring arrangement having a longitudinally extended scintillator which radially surrounds the scintillator, and which has a suitable design for conveying a cooling means, wherein the cooling device has at least one first hose and the cooling means is conveyed between an outer shell of the scintillator and an inner wall of the first hose.

15. The flexible cooling device of claim 4, wherein the cooling device is arranged in two or more sections.

\* \* \* \* \*